(12) United States Patent
Kuwamoto et al.

(10) Patent No.: US 8,286,126 B1
(45) Date of Patent: Oct. 9, 2012

(54) SYSTEMS AND METHODS FOR SPECIFYING STATES WITHIN IMPERATIVE CODE

(75) Inventors: Sho Kuwamoto, San Francisco, CA (US); Eliot Greenfield, Oakland, CA (US); Mark Anders, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/103,166

(22) Filed: May 9, 2011

Related U.S. Application Data

(63) Continuation of application No. 11/194,118, filed on Jul. 29, 2005, now Pat. No. 7,949,991.

(51) Int. Cl.
*G06F 9/44* (2006.01)

(52) U.S. Cl. .................................. 717/100
(58) Field of Classification Search .............. 717/100
See application file for complete search history.

(56) References Cited

U.S. PATENT DOCUMENTS

| | | | |
|---|---|---|---|
| 6,192,408 B1 | 2/2001 | Vahalia et al. | |
| 6,195,685 B1 | 2/2001 | Mekherjee et al. | |
| 6,564,246 B1 | 5/2003 | Varma et al. | |
| 7,234,133 B2 | 6/2007 | Klein | |
| 7,464,366 B2* | 12/2008 | Shukla et al. | 717/100 |
| 7,707,152 B1 | 4/2010 | Greenfield et al. | |
| 2002/0069263 A1 | 6/2002 | Sears et al. | |
| 2002/0116354 A1 | 8/2002 | Baudu et al. | |
| 2003/0105755 A1 | 6/2003 | Daynes | |
| 2003/0105805 A1 | 6/2003 | Jorgenson | |
| 2004/0002944 A1 | 1/2004 | Hauser et al. | |
| 2004/0068494 A1* | 4/2004 | Tozawa et al. | 707/3 |
| 2004/0068563 A1 | 4/2004 | Ahuja et al. | |
| 2004/0153504 A1 | 8/2004 | Hutchinson et al. | |
| 2004/0181579 A1 | 9/2004 | Huck et al. | |
| 2004/0237063 A1 | 11/2004 | Klein | |
| 2005/0038796 A1 | 2/2005 | Carlson et al. | |
| 2007/0006078 A1* | 1/2007 | Jewsbury et al. | 715/716 |
| 2007/0174318 A1* | 7/2007 | Leff et al. | 707/101 |
| 2007/0226218 A1 | 9/2007 | Chatterjee et al. | |
| 2008/0235682 A1* | 9/2008 | Oren et al. | 718/100 |
| 2008/0281832 A1 | 11/2008 | Pulver et al. | |
| 2009/0063421 A1 | 3/2009 | Burson et al. | |
| 2010/0185599 A1 | 7/2010 | Greenfield et al. | |

OTHER PUBLICATIONS

U.S. Appl. No. 11/192,985, filed Jul. 29, 2005.
Office Action dated Oct. 4, 2007 in related U.S. Appl. No. 11/192,985.
Office Action dated Mar. 25, 2008 in related U.S. Appl. No. 11/192,985.

(Continued)

*Primary Examiner* — Philip Wang
(74) *Attorney, Agent, or Firm* — Kilpatrick Townsend & Stockton LLP

(57) ABSTRACT

Systems and methods which implement declarative language for specifying states within imperative code are shown. According to embodiments an application program developer declaratively identifies one or more states within the imperative code of the application program. Declarative language identifying a particular state of an application program may both operate to identify the state and to describe the state so that the state may be selected or "jumped to" without a user having to navigate the application program flow to arrive at the state. Particular states may be described using a difference or "delta" between the particular state and another state, such as a base state. Transitions may be implemented between states, such as to provide animation, fading, color change, et cetera.

20 Claims, 2 Drawing Sheets

OTHER PUBLICATIONS

Advisory Action dated Jun. 9, 2008 in related U.S. Appl. No. 11/192,985.
Office Action filed Sep. 2, 2008 in related U.S. Appl. No. 11/192,985.
Office Action dated Apr. 28, 2009 in related U.S. Appl. No. 11/192,985.
Notice of Allowance dated Dec. 1, 2009 in related U.S. Appl. No. 11/192,985.
U.S. Appl. No. 11/437,185, filed May 19, 2006.
Office Action dated Dec. 22, 2008 in related U.S. Appl. No. 11/437,185.
Office Action dated Apr. 1, 2009 in related U.S. Appl. No. 11/437,185.
Office Action dated May 28, 2009 in related U.S. Appl. No. 11/437,185.
Office Action dated Sep. 1, 2009 in related U.S. Appl. No. 11/437,185.
U.S. Appl. No. 11/194,118, filed Jul. 29, 2005.
Office Action dated Jul. 7, 2009 in related U.S. Appl. No. 11/194,118.
Office Action dated Dec. 28, 2009 in related U.S. Appl. No. 11/194,118.
Advisory Action dated Mar. 24, 2010 in related U.S. Appl. No. 11/194,118.
Office Action dated Aug. 19, 2010 in related U.S. Appl. No. 11/194,118.
Allaire, "Macromedia Flash MX-A next-generation rich client", retrieved from http://download.macromedia.com/publflash/whitepapers/richclient.pdf on Jul. 2, 2009. Mar. 2002.
Kramer, "How to Write Doc Comments for Javadoc", Web page at http://web.archive.org/web/20010124043000/http://javasun.com/j2se/javadoc/writing doccomments/index.html (Jan. 24, 2001 as dated by Internet Archive), 25 pgs.

* cited by examiner

FIG. 3

```
<mx:State name="brand">
        <mx:AddChild>
                <mx:VBox>
                        <mx:Label text="Brand" />
                        <mx:ComboBox id="brand" />
                </mx:VBox>
        </mx:AddChild>
</mx:State>
<mx:State name="Televisions" basedOn="brand">
        <mx:AddChild>
                <mx:VBox>
                        <mx:Label text="Size" styleName="labelStyle" />
                        <mx:ComboBox id="tvSize" />
                        <mx:Label text="Options" styleName="labelStyle" />
                        <mx:CheckBox label="High Definition" />
                        <mx:CheckBox label="Widescreen" />
                        <mx:CheckBox label="Plasma" />
                        <mx:CheckBox label="LCD" />
                        <mx:CheckBox label="Flat-Panel" />
                        <mx:CheckBox label="Distortion Correction" />
                </mx:VBox>
        </mx:AddChild>
</mx:State>
<mx:State name="Stereos" basedOn="brand">
        <mx:AddChild>
                <mx:VBox>
                        <mx:Label text="Options" styleName="labelStyle" />
                        <mx:CheckBox label="Surround Sound" />
                        <mx:CheckBox label="THX Certified" />
                        <mx:CheckBox label="Multi-room" />
                        <mx:CheckBox label="Video I/O" />
                </mx:VBox>
        </mx:AddChild>
</mx:State>
```

SYSTEMS AND METHODS FOR SPECIFYING STATES WITHIN IMPERATIVE CODE

CROSS-REFERENCE TO RELATED APPLICATIONS

This application is a continuation application of U.S. Ser. No. 11/194,118 filed Jul. 29, 2005, now allowed, the contents of which are incorporated herein by reference.

The present application is related to commonly assigned U.S. patent application Ser. No. 11/192,985 entitled "Exposing Rich Internet Application Content to Search Engines," filed concurrently herewith, the disclosure of which is hereby incorporated herein by reference.

TECHNICAL FIELD

The present invention relates generally to computer programs and, more particularly, to implementing declarative language for specifying states within imperative code.

BACKGROUND OF THE INVENTION

The nearly ubiquitous adoption of computers has spawned a wide variety of application programs. The advent of the Internet and World Wide Web have resulted in the wide spread development of application programs operable upon various computing platforms. For example, browsers have been developed to execute or run upon various computing platforms, such as operating under control of the WINDOWS, UNIX, and MAC OS operating systems, to facilitate execution or running of Internet application programs. Such Internet application programs have often been developed using declarative code, such as using hypertext markup language (HTML), in order to facilitate operation on various computing platforms, communication via the Internet, operation in server/client environments, et cetera. The aforementioned declarative code describes what something is and thus is used to expressly define application program objects, such as a Web page to be displayed by the Internet application program. Most of the logic of such Web applications happens on the server. Accordingly, every time something needs to happen in the Web application, a server request is made in the form of a URL, and another page is returned, containing declarative markup.

This page-based model has its advantages. For example, if communications are interrupted during operation of the application program, the current condition of the application program may be readily reestablished using the declarative code for the current condition, such as by invoking a "refresh" command as is often available using the aforementioned browsers. Likewise, if a user wishes to return to a previous condition, the previous condition may be reestablished using the declarative code for the previous condition, such as by invoking a "back" command as is often available using the aforementioned browsers. If a user wishes to share a particular program condition with another user, a link to that condition, such as in the form of a uniform resource locator (URL), may be obtained and provided to a compatriot.

However, the page-based model is not without disadvantage. For example, each time a page is changed the previous page is discarded and a new page is loaded. Accordingly, a developer must fully describe each page using the declarative language, which results in duplicated code, adds network bandwidth demand, and can be hard to maintain. Moreover, page based application architecture using declarative-code makes it difficult to provide smooth animations and the level of polish expected from traditional applications.

Desktop application programs, such as application programs developed without regard to the ability to operate on different computing platforms and/or using client/server environments, often utilize imperative code. Such imperative code provides a set of instructions setting forth logic to provide desired operation as the application program flow progresses. Such procedural code provides a more robust programming environment, allowing for greater flexibility in developing application programs. Moreover, such imperative code results in efficiencies for the developer because the developer is not forced to describe each object and redescribe each object, even those which remain unchanged, as various program conditions are transitioned.

Some application programs have been developed which are a hybrid of the foregoing. For example, application programs have been developed using declarative code to describe particular program conditions and imperative code to execute program flow logic beyond the defined program conditions in order to provide robust application programs for use on multiple computing platforms, for a client/server environment, and/or adapted for Internet or other networking configurations. Application programs developed using FLEX, available from Macromedia, San Francisco Calif., provide examples of application programs employing imperative code which are operable over the Internet in a browser environment.

Although providing robust features and programming efficiencies for a developer, recovering from an anomalous flow interruption might require returning to a beginning of the application program flow rather than "refreshing" the current condition or going "back" to a previous condition. Similarly, sharing a link to a particular condition within the flow of the application program.

BRIEF SUMMARY OF THE INVENTION

The present invention is directed to systems and methods which implement declarative language for specifying states within imperative code. According to embodiments of the invention an application program developer declaratively identifies one or more states within the imperative code of the application program. Although the application program may dynamically flow and even morph through various states, such as in response to user input or other interaction, the developer can expressly identify particular states declaratively. Declaratively identifying states within imperative code according to embodiments of the invention may be utilized by a human reading the application program code as well as during runtime.

Declarative language identifying a particular state of an application program according to embodiments of the present invention both operates to identify the state and to describe the state. Accordingly, states specified according to embodiments of the invention may be selected or "jumped to," without a user having to navigate the application program flow to arrive at the state, or may otherwise be accessed randomly or out of sequence.

Rather than fully describing particular states, embodiments of the invention operate to describe a difference or "delta" between a particular state and another state, such as a base state. For example, a state change declaration may include new values for specific properties of pieces of the application program, new user interface structures to display as part of the existing application program, and/or the like, to display the result of some user action or newly loaded dynamic data.

In the foregoing embodiment, a base state, such as an initial state of the application program, may be fully described in the declarative language identifying the base state. The declarative language identifying particular other states (referred to herein as "step states" due to their being one or more steps removed from a base state) may thus describe a delta between the base state and the particular state (referred to herein as "first step states" due to their being once removed from a base state). The declarative language identifying particular other states may describe a delta between the particular state and another state which is itself described using a delta from another, perhaps base, state. Accordingly, step states (e.g., second step states, third step states, et cetera) may be defined which are cascaded from a base state. Where states are identified which have significant differences from a base state, additional base states (e.g., intermediate base states) may be identified and fully described in declarative language, such as to facilitate jumping to particular states.

According to a preferred embodiment, an application program development environment, such as FLEX BUILDER, available from Macromedia, San Francisco Calif., is adapted to derive, or assist in deriving, the differences between a base state and a step state identified by a developer and thus assists the developer in providing declarative language describing particular states according to the invention. For example, a developer may provide declarative language identifying a base state. Similarly, the developer may insert declarative language identifying another point in the application program, such as may be separated from the base state by logic of imperative code, as a step state. The development environment may operate to derive, or assist in deriving, a description of the differences between the application program user interface as it appears at the step state identified by the developer and a previous state in the flow (e.g., a base state or another step state). This delta may be added to the declarative language identifying the base state.

States identified according to embodiments of the invention may be selected for "jumping to" without a user navigating the program flow of the imperative code. For example, a user may wish to jump directly to a state without passing through various previous states. Likewise, a user may wish to share a link to a particular state within an application program with a compatriot. In operation according to embodiments of the invention, runtime operation of the application program allows direct navigation to a selected state, provided all conditions precedent are met (e.g., logging in, necessary data is obtained, et cetera), using imperative code by identifying a closest base state and implementing the base state and any step state deltas associated with a selected state. Such implementation of states and deltas is preferably accomplished in a "hidden" mode, such that a user is not aware of various states which may be traversed. Moreover, such implementation preferably takes a "shortest route" to arrive at a selected state, and thus will not necessarily traverse all states a user may have originally traversed to arrive at the selected state when using the application program.

Direct navigation between various states is supported according to embodiments of the invention. Accordingly, runtime operation supports not only implementing deltas to arrive at a selected step state from a base state, but also supports "rolling back" deltas in order to leave a first selected step state and arrive at a second selected step state via a base state, according to an embodiment of the invention.

Embodiments of the present invention provide for transitions to be implemented between states. For example, declarative language for a particular state provided according to embodiments of the invention may define transitions (e.g., animation, fading, color change, et cetera) between that state and one or more states. According to one embodiment, transitions are defined between particular states, such as to define a transition between a first state and a second state, between the first state and a third state, et cetera. Additionally or alternatively, transitions are defined with respect to a state, such as to define a transition used when entering a particular state or a transition used when exiting a particular state. The foregoing transition definitions may be used in combination, such as to use a transition defined with respect to a state when no transition is defined between the state and another state.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 3 shows a declarative code identifying and describing states which includes declarative code without imperative code according to an embodiment of the invention.

DETAILED DESCRIPTION OF THE INVENTION

Figure 1:
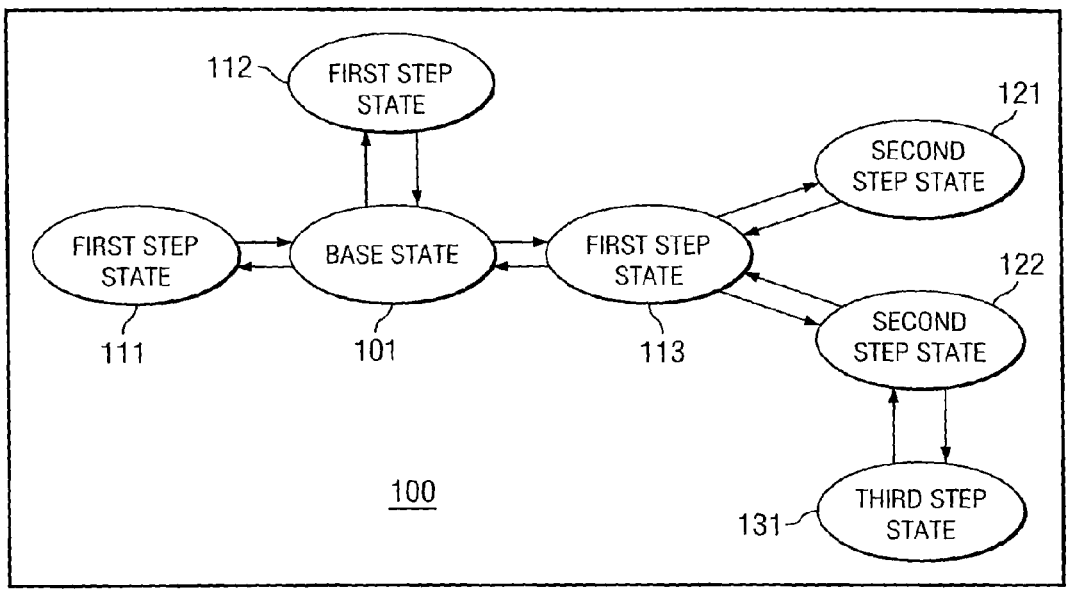
FIG. 1 shows a diagram of states as may be defined using declarative language within an application program which includes imperative code according to an embodiment of the invention.

Directing attention to FIG. 1, a diagram of states as may be defined using declarative language within an application program which includes imperative code according to an embodiment of the invention is shown. States 101-131 of the illustrated embodiment may represent various states of application program 100. For example, base state 101 may represent an initial state of the application program, step states 111-113 (a first tier of step states) may represent various functions or operations available through operation of the application program beyond the initial state, step states 121 and 122 (a second tier of step states) may represent various functions or operations available through operations of the application program beyond step state 113, and step state 131 (a third tier of step states) may represent various functions or operations available through operations of the application program beyond step state 122. Accordingly, it should be appreciated that states identified according to embodiments of the present invention may be organized in various topologies, including a star topology, a tree topology, and combinations thereof.

The foregoing states may represent a point in the application program at which a user receives particular data, queries the system, inputs particular data, a point in the application resulting from execution of logic of imperative code, et cetera. For example, according to embodiments of the invention the application program associated with states 101-131 comprises an application program executing imperative code to dynamically flow or "morph" through and between various states, such as in response to user input or other interaction. Additionally or alternatively, the foregoing states may represent states of components of application program 100. For example, a program component, such as a button, drop-down menu, et cetera, may have various states associated therewith. One or more of states 101-131 may define states of such a program component. Moreover, states 101-131 may define a combination of states of application program 100 and components thereof.

An application program developer declaratively identifies one or more states within application program 100 according to embodiments of the present invention. Accordingly, although the application program, or even components thereof, may employ imperative code which dynamically flows and even morphs through various states, such as in response to user input or other interaction, the developer can expressly identify such states declaratively.

In operation according to an embodiment of the present invention, a developer identifies a set of states application program 100 or component will go through during normal execution of the application program. The developer may then write declarative code to identify and describe each of these states. Such declarative code may not only describe the state, but may provide additional information, such as a description of content associated therewith, if desired. The developer may write imperative code that implements the basic flow and business logic of application program 100, preferably inserting instructions at appropriate points to switch between the states as described in the declarative code. During runtime, application program 100 preferably updates the user interface to reflect the appearance as described in the declarative code for the new state. Accordingly, declaratively identifying states within application program 100 according to embodiments of the invention may not only be useful during runtime for "jumping to" or otherwise identifying and moving to and between states, but may also be useful to a developer reading the application program code, such as for debugging, enhancement, et cetera.

Figure 2:
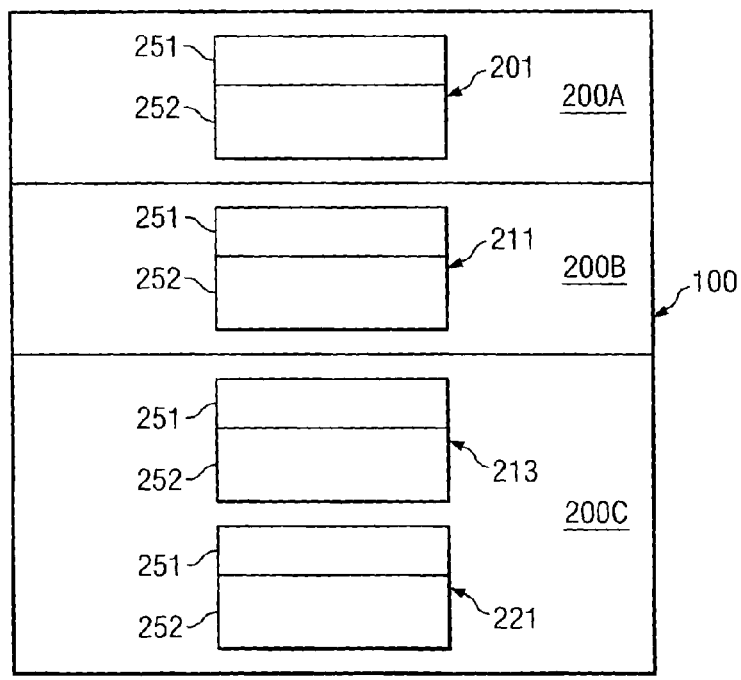
FIG. 2 shows a block diagram of declarative language disposed within an application program which includes imperative code according to an embodiment of the invention.

Directing attention to FIG. 2, a high level block diagram is provided to illustrate the inclusion of declarative language within application program 100 which also includes imperative code. In the embodiment illustrated in FIG. 2, application program 100 comprises imperative code comprising code segments 200A-200C. Such code segments may comprise various program modules or routines, as are commonly compartmentalized by programmers. However, it should be appreciated that the use of code segments as in the illustrated embodiment are not required according to the concepts of the present invention. According to the illustrated embodiment, declarative language 201 associated with a particular state (e.g., base state 101 of FIG. 1), is disposed at a selected point with respect to code segment 200A, declarative language 211 associated with a particular state (e.g., step state 111 of FIG. 1), is disposed at a selected point with respect to code segment 200B, and declarative language 213 and 221 associated with particular states (e.g., step states 113 and 121 of FIG. 1, respectively) are disposed at selected points with respect to code segment 200C.

Declarative language identifying a particular state of an application program according to embodiments of the present invention both operates to identify the state and to describe the state. Accordingly, states may be selected or "jumped to," or otherwise accessed randomly or non-sequentially, without a user having to navigate the application program flow to arrive at the state. Declarative language 201-221 of the illustrated embodiment, therefore, each include state identification 251 and state description 252.

State identification 251 may provide any form of state identification useful according to embodiments of the invention. For example, state identification 251 may comprise a human understandable description tag (e.g., login, data query, shopping cart, et cetera), such as may be useful to a developer when reviewing the code of application program 100. Additionally or alternatively, state identification 251 may comprise a tag used in computer directed navigation (e.g., a URL), such as may be useful in sharing links to states between users and/or as may be used in jumping to selected states.

State description 252 provides information from which the identified state may be recreated. However, rather than fully describing particular states, embodiments of the invention operate to describe a difference or "delta" between a particular state and another state, such as a base state. According to an embodiment, state description 252 of declarative language 201 may fully describe base state 101, such as by fully describing the user interface and all components thereof, describing any data needed to achieve the desired state, et cetera. However, state description 252 of declarative language 213 describing step state 113 may describe a delta between base state 101 and step state 113, such as by describing any differences in the user interface and components thereof, describing any additional data needed to achieve the desired state, releasing any unneeded data at the desired state, et cetera, as may be accomplished using a set of property changes and/or tree manipulations. Similarly, state description 252 of declarative language 221 describing step state 121 may describe a delta between first step state 113 and second step state 121, such as by describing any differences in the user interface and components thereof, describing any additional data needed to achieve the desired state, releasing any unneeded data at the desired state, et cetera. Accordingly, step states (e.g., second step states, third step states, et cetera) may be defined which are cascaded from a base state.

Where states are identified which have significant differences from a base state or which are substantially removed from a base state (e.g., a fifth tier state), additional base states (e.g., intermediate base states) may be identified and fully described in declarative language, such as to facilitate jumping to particular states. For example, where step state 131 has significant differences with respect to base state 101, step state 122 of an embodiment may be defined as an intermediate base state such that state description 252 thereof includes a full state description as described above with respect to base state 101.

Directing attention to FIG. 3, exemplary declarative code identifying and describing states according to an embodiment of the invention is shown. It should be appreciated that the embodiment of FIG. 3 shows state declarative code without imperative code as is included therewith in the above described embodiment of application program 100.

According to a preferred embodiment, an application program development environment, such as that of FLEX BUILDER, is adapted to derive, or assist in deriving, the differences between a base state (e.g., base state 101) and a step state (e.g., step states 111-113) identified by a developer and between step states (e.g., step states 113 and 121 and 122 and step states 122 and 131). Accordingly, although a developer may manually populate state description 252 of a particular declarative language, embodiments of the invention utilize automation with respect to the development environment to populate some or all of state description 252. For example, a developer may provide declarative language identifying and describing a particular point as base state 101 and may provide imperative language operable with respect to base state 101. Similarly, the developer may provide declarative language identifying a particular point as step state 113. The development environment may operate to assist the developer in deriving a description of the differences between the application program user interface as it appears at the step state and base state 101.

States defined according to embodiments of the present invention may have parameters associated therewith. For example, thousands of different states may exist for presenting personalized information to users of an application program, such as a banking program having a checking account state for customers to obtain their checking account balance. Embodiments of the invention utilized one or more parameters for that state to identify the user, the account, et cetera. Accordingly, a single declarative language may be utilized to provide different states for each user authorized to access the aforementioned checking account state.

It should be appreciated that states of the present invention may have multiple values associated with them. For example, a state need not be limited to "selected" or "unselected" with respect to an object, but may include further granularity with respect to the state. Using an expandable list item as an example, the item may be "selected" (e.g., highlighted) or "unselected" (e.g., grayed). However the item may further be "open" (e.g., showing expanded contents) or "closed" (e.g., hiding expanded contents). State descriptions, and thus deltas, may describe any combination of values making up a selected state. Moreover, state descriptions may include "don't care" values, such as where the state of a particular object is unimportant to a selected state. In such an embodiment, such an object may be left in a same state as a previous state, may be placed in a default state, et cetera.

States defined according to embodiments of the present invention may be associated with various levels within an application program. For example, objects within an application program may have states associated therewith in addition to the application program itself having states associated therewith. As but one example, a user interface page may comprise a plurality of buttons, menus, dials, data fields, et cetera which each have associated states. The states of these objects may themselves be rolled up into a larger state defining the state of the user interface.

It should be appreciated that states defined according to the present invention are not limited to manipulations but may include such things as styles, colors, sizes, et cetera. For example, a selected state may apply styles to a document, rather than changing what is in the document as would be the case where a state provides tree manipulations.

States defined according to embodiments of the present invention are discoverable. For example, other parts of the application or other applications can query as to whether there are states and, if so, what those states are. According to one embodiment, states are tied to a URL. In such an embodiment a state can map to a URL that is inside a browser, and by doing so can make it so that as a user moves through the application program flow the address bar will change letting the user know that he/she has navigated to a different place. The history list, the back button, et cetera of a browser will work in such an embodiment so that as the user selects the back button the user will go back to the previous state. Similarly, the user may take the URL and pass it along to someone else to enable this person to navigate to the selected state.

In operation, any of states 101-131 identified according to embodiments of the invention may be selected for "jumping to" without a user navigating the program flow of the imperative code of application 100. For example, a user may wish to jump directly to step state 122 without passing through previous states 101, 113, and/or 121. Likewise, a user may wish to share a link to any of states 101-131 to allow a compatriot to directly access the state without passing through various previous states. Runtime operation of application program 100 having declarative language of the present invention therein allows direct navigation to a selected state of states 101-131, provided all conditions precedent are met.

Embodiments of the invention may operate to verify that a particular state may presently be entered. For example, particular states may not be entered unless a user has logged into the system, such as to verify the identity of the user, to determine the user's account or other information, et cetera. Likewise, particular states may not be entered unless a condition precedent has been met, such as to select items for purchase before a checkout state is entered. Accordingly, application 100 may operate in runtime to cancel entering a state or delay entering a state (e.g., enter an intermediate step to query data from a user or delay entering the selected state while a database is accessed) when a particular state is selected for which all conditions precedent have not been met.

Direct navigation to and between states 101-131 according to embodiments of the invention operates to identify a closest base state and implementing the base state and any step state deltas associated with a selected state. For example, selection of step state 121 may cause application program 100 to identify base state 101 as the nearest base state (e.g., fewest number of identified states removed from step state 121, least significant deltas or fewest changes between the base state and the selected state). It should be appreciated that embodiments of the present invention may operate to identify a nearest base state as a base state either before or after the selected state in the imperative program flow, using "unwinding" of step state deltas as described below where a nearest base state is disposed in the imperative program flow after the selected state. Thereafter, base state 101 may be implemented, followed by step state 113, and then selected step state 121.

Implementation of states and deltas by application program 100 in directly navigating to a selected state is preferably accomplished in a "hidden" mode, such that a user is not aware of various states which may be traversed. Moreover, such implementation preferably takes a "shortest route" to arrive at a selected state, and thus will not necessarily traverse all states a user may have originally traversed to arrive at the selected state when using the application program. For example, although a user who provided a link to step state 121 may have arrived at this state by traversing base state 101, step state 113, and step state 122, implementation of states by application program 100 in directly navigating to state 121 for a user to which the link was provided may traverse base state 101 and step state 113.

Direct navigation between any of states 101-131 is supported according to embodiments of the invention. For example, application program 100 may be at state 111 and a user may indicate a desire to be at state 113. Runtime operation supports not only implementing deltas to arrive at a selected step state from a base state, but also supports "rolling back" deltas in order to leave a first selected state and arrive at a second selected state, according to an embodiment of the invention. Accordingly, implementation of states and deltas by application program 100 may operate to roll back step state 111 to base state 101 by reversing the delta associated with step state 111 and then to implement the delta associated with step state 113.

In addition to providing declarative language for identifying states, embodiments of the present invention utilized declarative language for facilitating navigation to and between states. For example, code provided within application program 100 to allow a user to select a particular state may be written in declarative language. Such an embodiment facilitates the development environment tool, the developer, et cetera understanding what the function of such state selection code is.

Embodiments of the present invention provide for transitions to be implemented between states. For example, a developer may wish to provide information and/or animation between states, such as to inform the user that the state is being transitioned, to occupy the user while data is being obtained or other conditions precedent are being met, to provide pleasing "eye wash," et cetera. Declarative language for a particular state provided according to embodiments of the invention may define transitions (e.g., animation, fading, color change, et cetera) between that state and one or more states. For example, state identification 251 and/or state description 252 may include information with respect to one or more transitions. Alternatively, additional declarative information (not shown) may be associated with the declarative language of states 101-131 to provide information with respect to one or more transitions. Transitions implemented according to embodiments of the invention are provided above or outside of the aforementioned states and thus are not required in order to go to or between states.

According to one embodiment, transitions are defined between particular states. For example, base state 101 may include information defining transitions between base state 101 and each of step states 111-131. The aforementioned transitions may provide a different transition between base state 101 and each of step states 111-131, may provide a same transition between base state 101 and each of step states 111-131, or may provide a different transition between base state 101 and some of step states 111-131 and a same transition between base state 101 and other ones of step states 111-131.

According to embodiments of the invention, transitions are defined with respect to a state rather than between two states (i.e., a transition is tied to one state rather than being tied to two states). For example, where a same transition is to be utilized with respect to base state 101 regardless of which step state is entered subsequently, a single transition for exiting base state 101 may be defined with respect to base state 101. Similarly, a transition for entering base state 101 may be defined with respect to base state 101.

The foregoing transition definitions may be used in combination. For example, a transition for exiting a state may be used when no transition specific to the subsequently selected state has been provided. Additionally or alternatively, a transition may be implemented with respect to navigation between a particular first state and a particular second state, whereas a transition may not be implemented with respect to navigation between the first state and a particular third state.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
executing an application program through an Internet browser, the application program comprising imperative code providing instructions setting forth logic to provide operations occurring as a flow of the application program progresses, wherein the application program maps different states of the application to different addresses, the application program comprising declarative language mapping the different states to the different respective addresses;
receiving input navigating from a first state of the application program to a second state of the application program; and
changing an address display of said Internet browser responsive to navigating from said first state to said second state, wherein the address display is changed from displaying a first address mapped to said first state to displaying a second address mapped to said second state.

2. The method of claim 1 further comprising returning to the first state of the application program responsive to receiving input to navigate back in the Internet browser.

3. The method of claim 1 wherein said declarative language comprises tags used in said different addresses for said respective different states.

4. The method of claim 1 wherein navigating to said second state is permitted only if a condition precedent has been met.

5. The method of claim 4 further comprising, if navigation to said second state is not permitted, querying for user data before navigating to said second state.

6. The method of claim 1 further comprising providing the second address to enable a second Internet browser to execute the application program and navigate directly to said second state.

7. The method of claim 6 wherein second Internet browser is enabled to navigate directly to said second state by implementing said first state in a hidden mode during execution of said application program.

8. The method of claim 1 wherein said application program comprises a rich Internet application.

9. The method of claim 1:
wherein the application program maps different states of the application to different respective uniform resource locator (URL) addresses; and
wherein the address display is changed from displaying a first URL address mapped to said first state to displaying a second URL address mapped to said second state.

10. A system comprising:
an application program stored on a computer readable medium having computer executable code thereon, said application program comprising:
imperative code providing a set of instructions setting forth logic to provide operations occurring as a flow of the application program progresses; and
declarative language associated with a selected portion of said imperative code, said declarative language associated with a predetermined state other than an initial state of said application program and allowing direct navigation to said predetermined state, wherein navigating to said predetermined state is permitted only if a condition precedent has been met.

11. The system of claim 10 wherein navigating to said predetermined state comprises implementing a first state in a hidden mode.

12. The system of claim 10 wherein the condition precedent comprises verifying a user identity or user information.

13. The system of claim 10 wherein the condition precedent comprises determining a user account.

14. The system of claim 10 wherein the condition precedent comprises querying for user data.

15. The system of claim 10 wherein the condition precedent comprises accessing a database.

16. The system of claim 10 wherein said application program comprises a Web enabled application program operable in an Internet browser.

17. The system of claim 10 wherein said declarative language comprises state identification information and state description information, wherein said identification information comprises a tag utilized in a uniform resource locator for said predetermined state.

18. The system of claim 10 wherein said predetermined state is discoverable in runtime by other states of said application program.

19. A non-transitory computer readable medium having computer executable code thereon, said medium comprising an application program comprising:
imperative code providing a set of instructions setting forth logic to provide operations occurring as a flow of the application program progresses; and
declarative code associated with a selected portion of said imperative code, said declarative code associated with a predetermined state other than an initial state of said application program and allowing direct navigation to said predetermined state, wherein navigating to said predetermined state is permitted only if a condition precedent has been met.

20. The medium of claim 19 wherein the condition precedent comprises one or more of verifying a user identity; verifying user information, determining a user account, querying for user data, and accessing a database.

* * * * *